United States Patent
Inokuchi

(10) Patent No.: US 10,454,350 B2
(45) Date of Patent: Oct. 22, 2019

(54) CONTROLLER-INTEGRATED ROTATING ELECTRIC MACHINE

(71) Applicant: DENSO CORPORATION, Kariya, Aichi-pref. (JP)

(72) Inventor: Takatoshi Inokuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 15/403,716

(22) Filed: Jan. 11, 2017

(65) Prior Publication Data

US 2017/0201162 A1    Jul. 13, 2017

(30) Foreign Application Priority Data

Jan. 13, 2016   (JP) ................. 2016-004272

(51) Int. Cl.

| | |
|---|---|
| H02K 11/33 | (2016.01) |
| H02K 1/12 | (2006.01) |
| H02K 1/22 | (2006.01) |
| H02K 5/18 | (2006.01) |
| H02K 5/22 | (2006.01) |
| H02K 7/00 | (2006.01) |
| H02K 13/00 | (2006.01) |
| H02P 25/22 | (2006.01) |
| B60L 15/00 | (2006.01) |

(Continued)

(52) U.S. Cl.
CPC ............ *H02K 11/33* (2016.01); *B60L 15/007* (2013.01); *B60L 50/51* (2019.02); *B60L 53/22* (2019.02); *B60L 53/24* (2019.02); *H02K 1/12* (2013.01); *H02K 1/22* (2013.01); *H02K 5/18* (2013.01); *H02K 5/225* (2013.01); *H02K 7/006* (2013.01); *H02K 13/003* (2013.01); *H02P 25/22* (2013.01); *B60L 2220/42* (2013.01); *H02J 7/14* (2013.01); *H02P 27/06* (2013.01)

(58) Field of Classification Search
CPC .......... H02K 5/18; H02K 5/225; H02K 7/006; H02K 11/33; H02P 25/22; B60L 15/007; B60L 50/51; B60L 53/22; B60L 53/24
See application file for complete search history.

(56) References Cited

U.S. PATENT DOCUMENTS

| | | | |
|---|---|---|---|
| 4,849,856 A | 7/1989 | Funari et al. | |
| 2007/0257568 A1* | 11/2007 | Akita | ............... H02K 11/048 310/64 |

(Continued)

FOREIGN PATENT DOCUMENTS

| | | |
|---|---|---|
| JP | 3139856 U | 3/2008 |
| JP | 2010-161846 A | 7/2010 |

*Primary Examiner* — Quyen P Leung
*Assistant Examiner* — Minki Chang
(74) *Attorney, Agent, or Firm* — Oliff PLC

(57) ABSTRACT

A controller-integrated rotating electric machine includes a rotating electric machine having a rotor, a stator, and a housing, and a controller having a plurality of switching element modules. Cooling fins having insulating coatings on surfaces thereof facing the switching element modules are bonded to the switching element module. The controller-integrated rotating electric machine of which the cooling fins are electrically insulated by having the cooling fins having the insulating coating on the surfaces facing the switching element modules, so that the electrolytic corrosion between the cooling fins and the heat sinks of the switching element modules is suppressed from occurring.

6 Claims, 8 Drawing Sheets

(51) Int. Cl.
*B60L 53/22* (2019.01)
*B60L 50/51* (2019.01)
*B60L 53/24* (2019.01)
*H02J 7/14* (2006.01)
*H02P 27/06* (2006.01)

(56) References Cited

U.S. PATENT DOCUMENTS

| | | | |
|---|---|---|---|
| 2009/0194869 A1* | 8/2009 | Eom | H01L 23/367 257/712 |
| 2011/0101804 A1 | 5/2011 | Isoda et al. | |
| 2014/0070645 A1* | 3/2014 | Maeda | H02K 19/365 310/64 |
| 2014/0203675 A1 | 7/2014 | Maeda et al. | |
| 2014/0361648 A1* | 12/2014 | Shirakata | H02K 11/046 310/52 |
| 2015/0162808 A1* | 6/2015 | Kato | H02K 9/22 310/43 |
| 2016/0036281 A1 | 2/2016 | Nakano et al. | |

* cited by examiner

CONTROLLER-INTEGRATED ROTATING ELECTRIC MACHINE

CROSS-REFERENCE TO RELATED APPLICATION

This application is based on and claims the benefit of priority from earlier Japanese Patent Application No. 2016-4272 filed Jan. 13, 2016, the description of which is incorporated herein by reference.

TECHNICAL FIELD

The present disclosure relates to a controller-integrated rotating electric machine.

BACKGROUND

Conventionally, a controller-integrated rotating electric machine that has a rotating electric machine and a controller is used as a rotating electric machine for a vehicle.

Such a controller-integrated rotating electric machine is disclosed in Japanese Patent No. 5774207, for example.

JP No. 5774207 discloses a controller having a power module structure in which cooling fins (heat sink) are fixed to a power module via an insulating member.

Note that the cooling fins are integrally formed with the heat sink in JP No. 5774207.

The cooling fins of the controller do not have a potential as they are fixed via the insulating member. For this reason, there is no concern of electrolytic corrosion of the cooling fins.

However, the conventional controller has a configuration that the power module and the cooling fins are bonded and the resin is filled around the power module.

In this configuration, the cooling fins are going to have a potential in a case where minute conductive foreign matter enters into a bonding portion to form a conductive path route, or in a case where a void is generated in the bonding portion and water vapor enters to form a leak path.

Then, a housing of the rotating electric machine is normally connected to a battery, and the cooling fins are going to have a potential different from that of the housing. That is, even with the conventional controller, there was a possibility of electrolytic corrosion in the cooling fins.

SUMMARY

An embodiment provides a controller-integrated rotating electric machine equipped with a controller in which reliability is suppressed from deteriorating due to electrolytic corrosion.

A controller-integrated rotating electric machine according to a first aspect includes a rotating electric machine having a rotor in which a magnetic pole is formed by energizing a rotor winding, a stator disposed so as to face the rotor, and a housing holding the rotor and the stator.

The controller-integrated rotating electric machine further includes a controller having a plurality of switching element modules, each of which includes a switching element, an inverter circuit for supplying alternating current to the rotating electric machine, and a rectification circuit for rectifying alternating current supplied from the rotating electric machine.

Cooling fins, each of which has an insulating coating on a surface thereof facing the switching element module, are bonded to the switching element module.

In the controller-integrated rotating electric machine of the present disclosure, the controller is provided with the cooling fins. Then, the cooling fins have the insulating coatings on the surfaces facing the switching element module.

According to the present configuration, the cooling fins are electrically insulated. That is, there is no potential difference between the cooling fins and the switching element module, and electrolytic corrosion is suppressed from occurring.

DETAILED DESCRIPTION OF THE PREFERRED EMBODIMENTS

[Embodiment]

Hereinafter, the present disclosure will be described in more detail by using an embodiment.

In the present embodiment, a controller-integrated rotating electric machine of the present disclosure will be described applying it to a rotating electric machine for a vehicle mounted on a vehicle.

A configuration of a controller-integrated rotating electric machine of the present embodiment will be described with reference to FIGS. 1 to 10.

Figure 1:
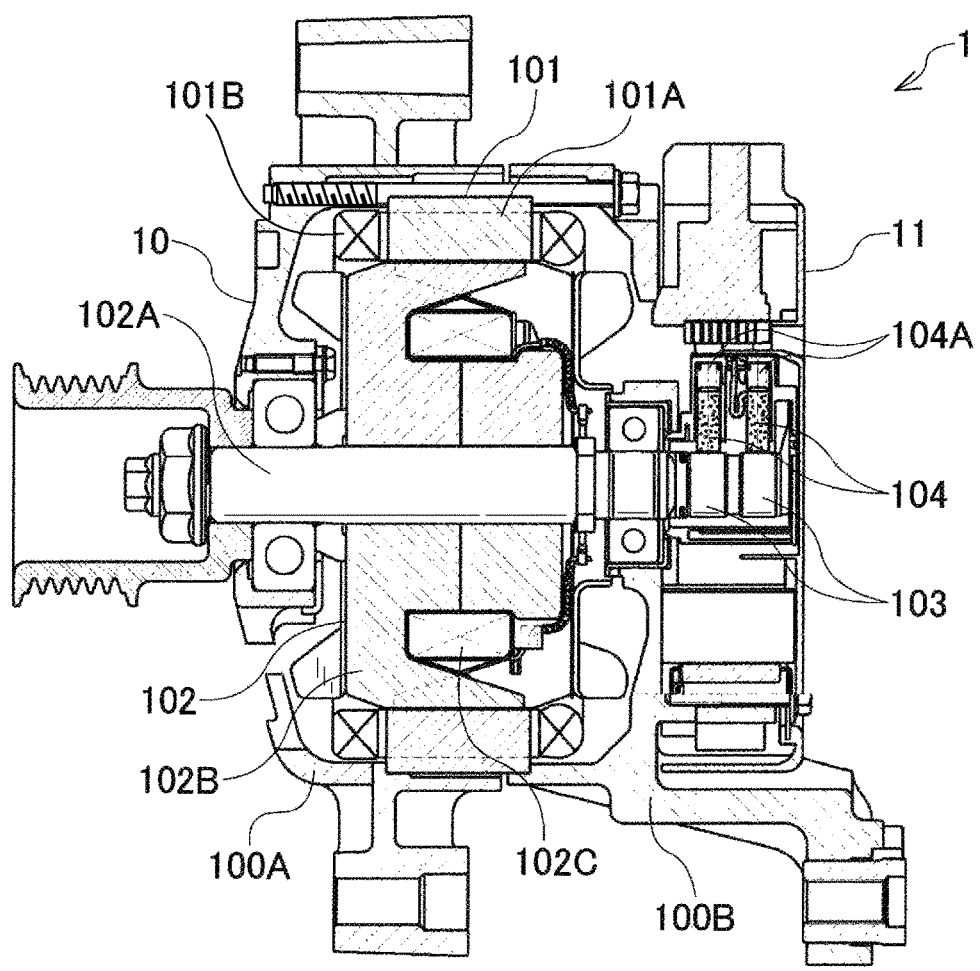
FIG. 1 shows an axial cross-sectional view of a controller-integrated rotating electric machine of an embodiment.

FIG. 1 is a sectional view showing a configuration of a controller-integrated rotating electric machine 1 of the present embodiment.

The controller-integrated rotating electric machine 1 of the present embodiment is a device mounted on a vehicle and generating a driving force for driving a vehicle by being supplied with electric power from a battery.

It is also a device that generates electric power for charging the battery by being supplied with a driving force from an engine of the vehicle.

The controller-integrated rotating electric machine 1 includes a rotating electric machine 10 and a controller 11.

[Rotating Electric Machine]

The rotating electric machine 10 is a machine that generates a driving force for driving the vehicle by being supplied with the electric power.

The rotating electric machine 10 is also a machine that generates electric power for charging the battery by being supplied with the driving force from the engine.

The rotating electric machine 10 includes a housing 100, a stator 101, a rotor 102, slip rings 103, and brushes 104.

The housing 100 is a member that accommodates the stator 101 and the rotor 102 in a state in which they are opposed to each other, and is a member that rotatably supports the rotor 102.

Further, the housing 100 is also a member to which the controller 11 is fixed. The housing 100 is composed of a front housing 100A and a rear housing 100B.

The stator 101 constitutes a part of a magnetic path, and is a member that generates a rotating magnetic field by a current being applied.

In addition, while the stator 101 constitutes a part of the magnetic path, the stator 101 is also a member that generates alternating current by interlinking with a later-described magnetic flux generated by the rotor 102.

The stator 101 includes a stator core 101A and stator windings 101B.

The rotor 102 constitutes a part of the magnetic path, and is a member that forms a magnetic pole by a current being applied. The rotor 102 includes a rotating shaft 102A, a rotor core 102B, and a rotor winding 102C.

The slip rings 103 and the brush 104s are members for supplying direct current to the rotor winding 102C. The slip rings 103 are fixed onto an outer peripheral surface of the rotating shaft 102A via insulating members.

The brushes 104 are pressed against the rotary shaft 102A by springs 104A, and are held by a brush holder in a state where end faces thereof are in contact with outer peripheral surfaces of the slip rings 103.

[Controller]

The controller 11 is a device that controls the electric power supplied from the battery to the rotating electric machine 10 so as to generate the driving force to the rotating electric machine 10.

Further, the controller 11 is also a device that converts electric power generated by the rotating electric machine 10 and supplies it to the battery in order to charge the battery.

The controller 11 is a device that includes an inverter circuit that supplies alternating current to the rotating electric machine 10, and a rectification circuit that rectifies alternating current supplied from the rotating electric machine 10.

Figure 2:
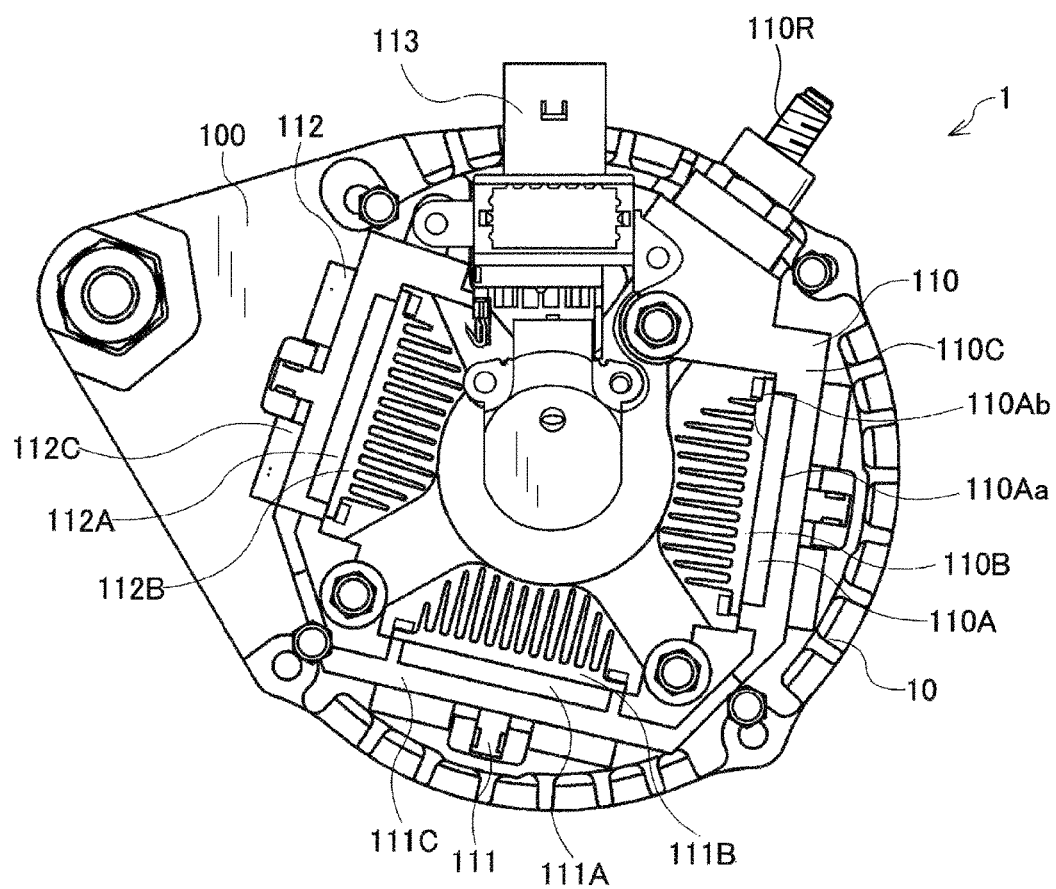
FIG. 2 shows a front view of the controller-integrated rotating electric machine of the embodiment as viewed from a controller side.

As shown in FIG. 2, the controller 11 includes a power terminal-integrated power assembly 110, power assemblies 111 and 112, a regulator 113, and a cover (not shown).

The controller 11 corresponds to a control section, and the power assemblies 110, 111, 112 correspond to switching element modules.

[Power Terminal-integrated Power Assembly]

The power terminal-integrated power assembly 110 is an aggregate of components constituting the inverter circuit and the rectification circuit.

Figure 3:
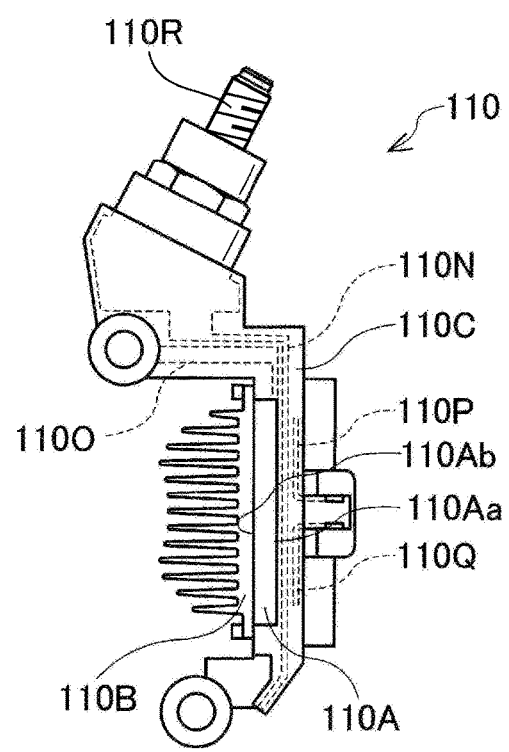
FIG. 3 is a front view showing a configuration of a power terminal-integrated power assembly.

As shown in FIG. 3, the power terminal-integrated power assembly 110 includes a power module 110A, cooling fins 110B, and a power terminal-integrated bus bar assembly 110C.

Figure 4:
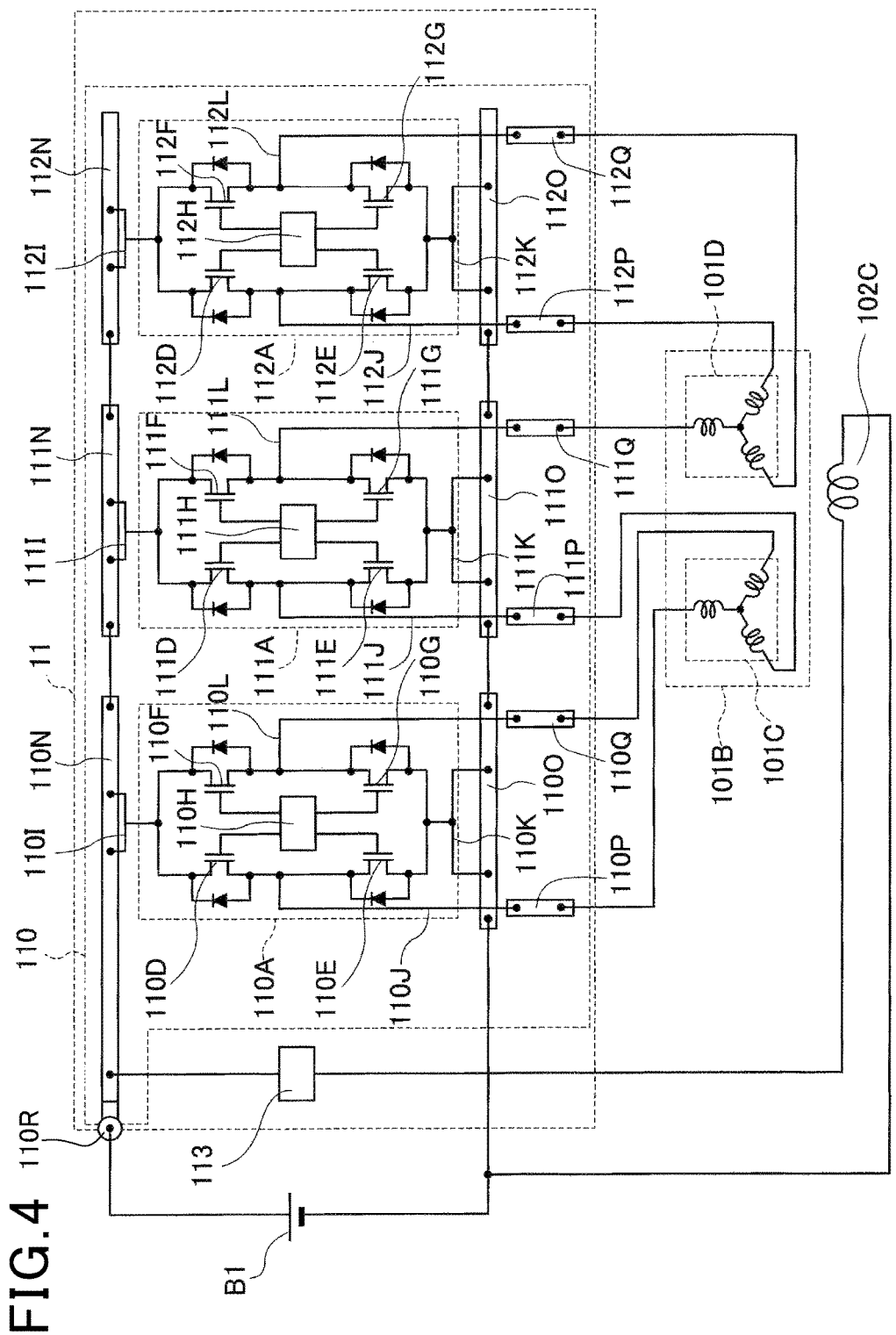
FIG. 4 shows a circuit diagram of the controller-integrated rotating electric machine according to the embodiment.

As shown in FIG. 4, the power module 110A is a switching element module having four switching elements (MOSFETs 110D to 110G) constituting the inverter circuit and the rectification circuit.

The power module 110A includes an IC 110H as a control section for controlling each of the MOSFETs 110D to 110G.

The MOSFETs 110D and 110E, and the MOSFETs 110F and 110G are connected in series, respectively.

Sources of the MOSFETs 110D and 110F are connected to drains of the MOSFETs 110E and 110G, respectively.

Among the two MOSFETs 110D and 110E connected in series, the MOSFET 110D connected to a positive electrode side of a battery B1 corresponds to a high potential side switching element, and the MOSFET 110E corresponds to a low potential side switching element.

As shown in FIG. 4, the MOSFETs 110D to 110G of the power module 110A and the MOSFETs 111D to 111E of a power module 111A are connected to each phase of a set of three-phase electric windings 101C.

That is, the two power modules 110A and 111A control the three-phase electric windings 101C.

The series-connected MOSFETs 110D to 110E of the power module 110A are connected to one phase of the three-phase electric windings 101C.

The MOSFETs 110F to 110G are connected to another phase of the three-phase electric windings 101C.

The series-connected MOSFETs 111D to 111E of the power module 111A are connected to the remaining phase of the three-phase electric windings 101C.

That is, the power module 110A is connected to two phases of the three-phase electric windings 101C, and the power module 111A is connected to the remaining phase of the three-phase electric windings 101C.

Figure 5:
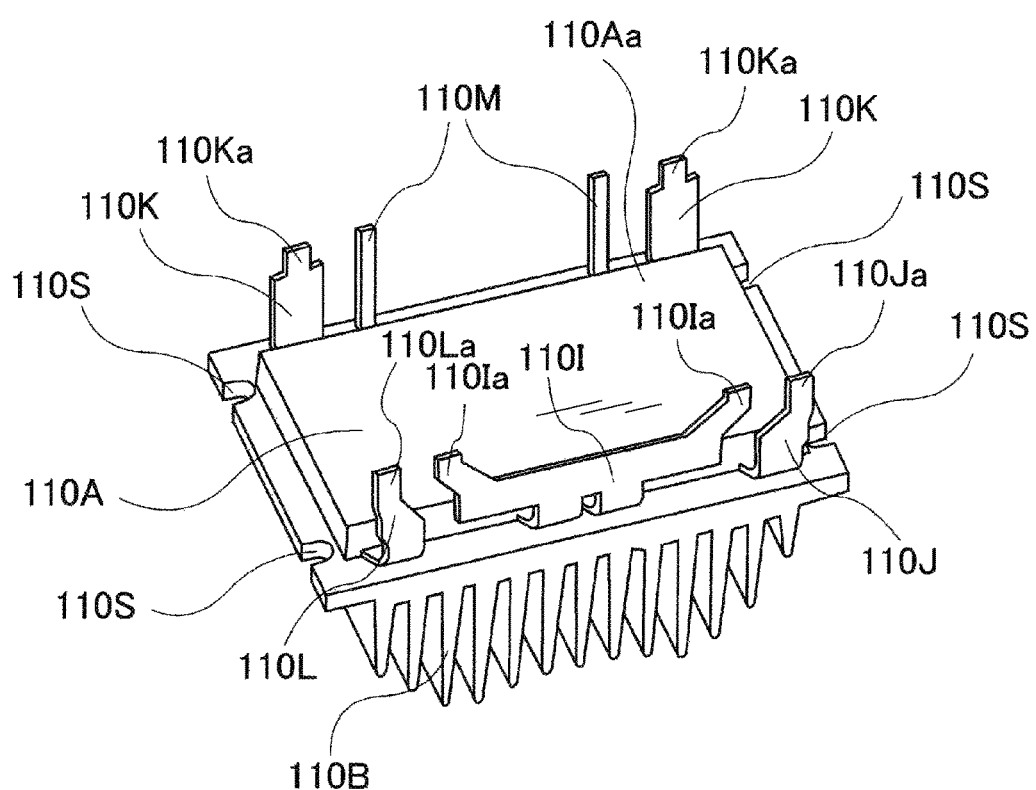
FIG. 5 is a perspective view showing a configuration of a power module and cooling fins.

As shown in FIGS. 4 to 5, the power module 110A is provided with the MOSFETs 110D and 110F on the same substrate portion 110I, the MOSFET 110E on the substrate portion 110J, and the MOSFET 110G on the substrate portion 110L, respectively.

The power module 110A includes a substrate portion 110K provided with the IC 110H and connected to the MOSFETs 110E and 110G, and a terminal section 110M through which a control signal of the IC 110H flows.

The MOSFETs 110D to 110G and the IC 110H are resin-molded by the power module 110A.

The substrate portions 110I to 110M installed by the MOSFETs 110D to 110G are made of conductive metal plates.

FIG. 5 is a perspective view of the power module 110A to which the cooling fins 110B are attached as seen from a surface 110Aa side of the power module 110A.

Figure 6:
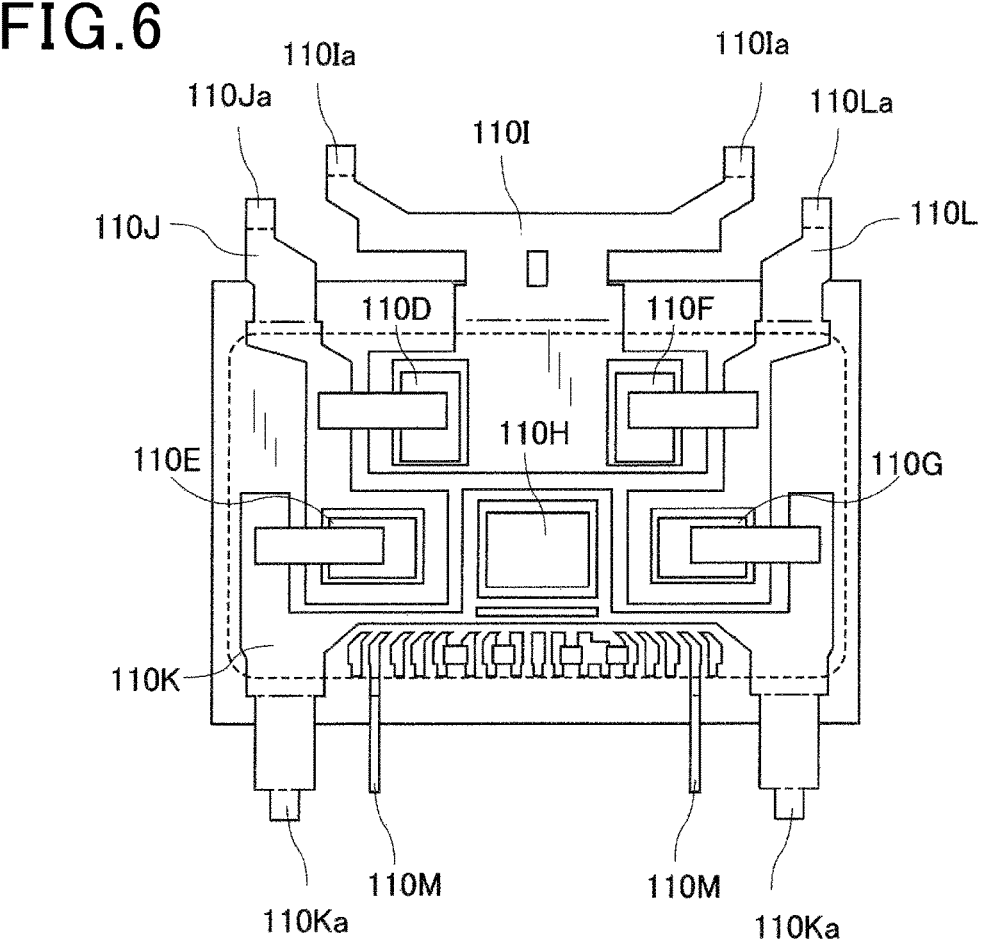
FIG. 6 is a configuration diagram showing a configuration of the power terminal-integrated power assembly.

FIG. 6 is a configuration diagram showing a mounting configuration of each element of the power module 110A, and a broken line shows a resin mold.

In FIG. 6, each of the substrate portions 110I to 110M is shown developed in plain view.

The substrate portions 110I to 110M in FIG. 6 are bent in a direction perpendicular to a surface of the drawing (toward the front side of the drawing) at one-dotted broken lines outside the resin mold in the drawing.

As shown in FIG. 6, the substrate portions 110I to 110M also function as terminals for connecting the power module 110A and external circuits.

The substrate portion 110I corresponds to a battery side terminal connected to the positive electrode of the battery B1, the substrate portions 110J, 110L correspond to a motor side terminal connected to the rotating electric machine 10, and the substrate portion 110K corresponds to a low potential side terminal connected to the negative electrode of the battery B1, respectively.

Drains of the MOSFETs 110D and 110F are connected to the substrate portion 110I.

As shown in FIG. 5, the substrate portion 110I has a substantially X-shaped configuration protruding from a portion where the drains of the MOSFETs 110D and 110F are connected to an outside of the resin mold at one location and branching into two branches outside the resin mold.

The substrate portion 110I has a pair of connecting portions 110Ia, 110Ia, which are connected to a bus bar 110N, which is one of the external circuits, of the power terminal-integrated bus bar assembly 110C, at a tip portion thereof branched into two branches.

The pair of connecting portions 110Ia, 110Ia are formed so as to have the same shapes.

The substrate portion 110J is connected to the drain of the MOSFET 110E.

In addition, the substrate portion 110J is connected to the source of the MOSFET 110D by a bridge.

The substrate portion 110J forms a series connecting portion between the MOSFET 110D and the MOSFET 110E.

The substrate portion 110J projects outward from the resin mold at one location, and has a connecting portion 110Ja, which is connected to the bus bar 110P of the bus bar assembly 110C, at a tip portion thereof.

The connecting portion 110Ja is formed so as to have the same shape as the pair of connecting portions 110Ia, 110Ia.

The substrate portion 110L is connected to the drain of the MOSFET 110G.

In addition, the substrate portion 110L is connected to the source of the MOSFET 110F by a bridge.

The substrate portion 110L forms a series connecting portion between the MOSFET 110F and the MOSFET 110G.

The substrate portion 110L projects outward from the resin mold at one location, and has a connecting part 110La, which is connected to the bus bar 110Q of the bus bar assembly 110C, at a tip portion thereof.

The connecting portion 110La is formed so as to have the same shape as the connecting portions 110Ia, 110Ia, 110Ja.

As shown in FIGS. 5 and 6, the respective connecting portions 110Ia, 110Ia, 110Ja and 110La of the substrate portions 110I, 110J and 110L protrude from a one side of a rectangular resin mold.

The substrate portion 110K is provided with the IC 110H. The substrate portion 110K is connected to the sources of the MOSFETs 110E, 110G via bridges.

As shown in FIG. 6, the substrate portion 110K has a substantially H-shaped configuration protruding at two positions to the outside of the resin mold, and has a pair of connecting portions 110Ka, 110Ka connected to the bus bar of the bus bar assembly 110O at tip portions of the protrusions.

The pair of connecting portions 110Ka, 110Ka are formed so as to have the same shapes as the connecting portions 110Ia, 110Ia, 110Ja, 110La.

As shown in FIGS. 5 and 6, the pair of connecting portions 110Ka, 110Ka of the substrate portion 110K protrude from another side of the rectangular resin mold.

The pair of connecting portions 110Ka and 110Ka protrude so as to be opposed from the one side of the rectangular resin mold.

A control signal of the IC 110H flows through the terminal sections 110M, 110M.

The terminal sections 110M, 110M are connected to the IC 110H by a conductive path route (not shown).

As shown in FIGS. 5 and 6, the pair of terminal sections 110M, 110M protrude from the other side of the rectangular resin mold like the pair of connecting portions 110Ka, 110Ka.

In the power module 110A, a back surface 110Ab thereof to which the cooling fins 110B are connected is formed by a heat sink made of metal for dissipating the heat generated by the power module 110A.

The back surface 110Ab of the power module 110A corresponds to a surface on which the drain connected to the positive electrode of the battery B1 of the MOSFET 110 shown in FIGS. 5 and 6 is positioned.

The cooling fins 110B shown in FIGS. 2 and 3 are members made of metal for dissipating the heat generated by the power module 110A.

The metal forming the cooling fins 110B is not limited as long as it is a material capable of dissipating the heat generated by the power module 110A.

As such a metal, a metal having excellent thermal conductivity can be used, and specific examples of the metal include aluminum, copper, gold and silver.

Note that a metal having a thermal conductivity comparable to that of these metals can be used in an operating temperature range of the controller-integrated rotating electric machine of the present embodiment.

That is, other metals and alloys can be used.

The cooling fins 110B are made of aluminum, having insulating coatings formed on their surfaces.

The insulating coatings on the surface of the cooling fins 110B are not limited as long as they can demonstrate insulation properties.

As the insulating coating, a coating such as an anodized coating or a resin coating can be mentioned.

Although the anodized coating may be coated on the cooling fins 110B in a state where the cooling fins 110B are being formed into a predetermined shape, the anodized coating may be coated on a long shaped body extending along a direction perpendicular to the surface of FIG. 2 and cut into a predetermined length afterwards.

In the present embodiment, the anodized coating is coated on a long shaped body and the body is cut into a predetermined length to form the cooling fins 110B.

The cooling fins 110B are bonded to the back surface 110Ab of the power module 110A with an insulating adhesive.

The adhesive having insulating property is an adhesive that demonstrates electrical insulation in the operating temperature range of the controller-integrated rotating electric machine of the present embodiment.

As the insulating adhesive, it is preferable to use an adhesive having excellent thermal conductivity. A resin adhesive can be mentioned as such an adhesive. Specifically, silicone-based adhesives can be mentioned.

The insulating adhesive may contain filler. Like the adhesive, the filler preferably has not only insulation but also thermal conductivity, and inorganic filler can be mentioned. More specifically, glass fillers and ceramic fillers can be mentioned.

The power terminal-integrated bus bar assembly 110C is an aggregate of components for wiring the power module 110A.

More specifically, as shown in FIG. 3, the power terminal-integrated bus bar assembly 110C is a member that fixes the bus bars 110N to 110Q described later for wiring the power module 110A with a resin, and a power terminal 11OR described later is connected with a predetermined bus bar 110N.

As shown in FIG. 3, the bus bar assembly 110C includes the bus bars 110N to 110Q and the power terminal 110R.

As shown in FIG. 3, the bus bar 110N is a member made of a plate-like metal for wiring the drains of the MOSFETs 110D and 110F to the positive electrode of the battery B1.

The bus bar 110N is connected to the pair of connecting portions 110Ia, 110Ia of the substrate portion 110I.

Connection between the bus bar 110N and the pair of connecting portions 110Ia, 110Ia is performed by welding (for example, TIG welding).

The bus bar 110O is a member made of a plate-like metal for wiring to the grounded negative electrode of the battery B1 by wiring the sources of the MOSFETs 110E, 110G to the grounded housing 100 of the rotating electric machine 10.

The bus bar 110P is a member made of a plate-like metal for wiring the series connecting portion between the MOSFETs 110D and 110E to a first windings 101C constituting the stator windings 101B.

The bus bar 110Q is a member made of a plate-like metal for wiring the series connecting portion between the MOSFETs 110F and 110G to the first windings 101C constituting the stator windings 101B.

As shown in FIG. 3, the bus bars 110N to 110Q are integrally fixed with resin with a predetermined space therebetween.

As shown in FIGS. 3 and 4, the power terminal 110R is a member made of a metal for connecting the wiring from the positive electrode of the battery B1.

The power terminal 110R is integrally fixed with resin together with the bus bars 110N to 110Q in a state of being connected to the bus bar 110N.

As shown in FIGS. 2 and 3, the power module 110A is fixed to the bus bar assembly 110C in a state of being connected to the bus bars 110N to 110Q.

The cooling fins 110B are fixed to the power module 110A and the bus bar assembly 110C.

As described above, the cooling fins 110B are bonded to the power module 110A with the insulating adhesive. Further, as shown in FIG. 7, the cooling fins 110B are fixed to the bus bar assembly 110C by thermal crimping.

Figure 7:
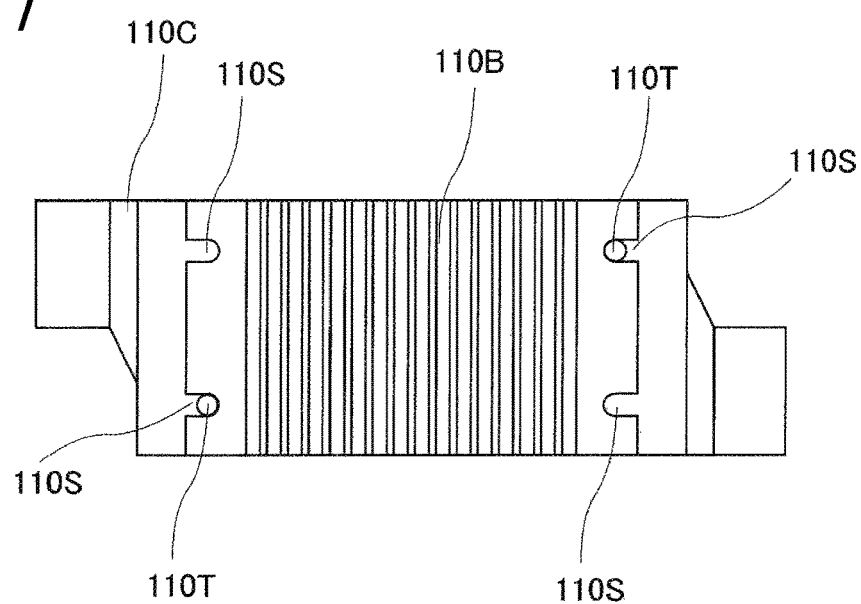
FIG. 7 shows a view describing a mounting structure of the cooling fins.

FIG. 7 is a diagram of a vicinity of the cooling fins 110B of the power module 110A as seen from the cooling fins 110B side (that is, the back surface 110Ab side of the power module 110A).

As shown in FIG. 7, a total of four notches 110S are formed on two opposing sides of the cooling fins 110B, the sides oppose along a circumferential direction of the rotary shaft 102A when assembled with the rotating electric machine 10.

Two notches 110S are formed per side. The notches 110S are disposed at symmetrical positions in the circumferential direction of the cooling fins 110B.

That is, when the cooling fins 110B are rotated 180 degrees in the circumferential direction in the state shown in FIG. 7, the notches 110S before and after the rotation are formed to coincide.

Protrusions 110T to be inserted into the notches 110S are formed on the bus bar assembly 110C.

When the power assembly 110 is formed, the protrusions 110T are formed at positions where they are inserted into the notches 110S with heights such that their tips protrude through the cooling fins 110B.

The protrusions 110T are provided so as to be insertable into each of the two sides on which the notch 110S is formed.

The two protrusions 110T are disposed at symmetrical positions in the circumferential direction of the cooling fins 110B.

One of the protrusions 110T is disposed in a notch 110S that is apart from the pair of power terminals 110R among the two notches 110S disposed on one side.

A tip of the protrusion 110T expands radially more than the size of the notch 110S by thermal crimping in a state where the protrusion 110T is inserted in the notch 110S, and the protrusion 110T fixes the cooling fins 110B in a state where it is in close contact with the bus bar assembly 110C.

As shown in FIG. 2, the power assembly 110 is disposed such that one side of the rectangular resin mold (specifically, a side from which the terminal sections 110Ia, 110Ia, 110Ja, 110La protrude) is positioned in an axial direction of the rotary shaft 102A and in a direction away from the housing 100 (specifically, the rear housing 100B).

In the power assembly 110, the connection between the power module 110A and the bus bar assembly 110C is not limited.

Figure 8:
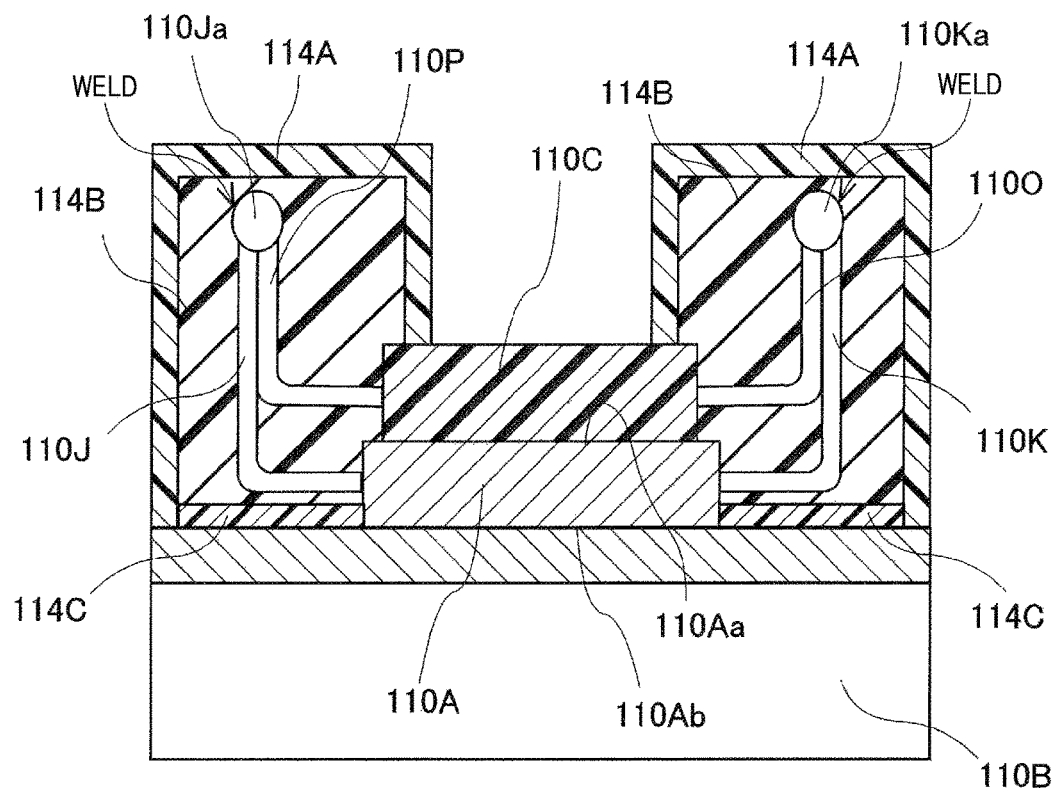
FIG. 8 is a sectional view schematically showing a connection structure between the power module and a bus bar assembly of the power assembly.

For example, the configuration shown in FIG. 8 can be adopted.

FIG. 8 is a sectional view schematically showing a connection structure between the power module 110A (substrate portions 110I, 110K) of the power assembly 110 and the bus bar assembly 110C (bus bars 110N, 110O).

Note that FIG. 8 is the sectional view of a valley portion of the cooling fins 110B, and although not shown, an adhesive layer formed from the above adhesive is formed between the power module 110A and the cooling fins 110B.

As shown in FIG. 8, the substrate portion 110J and the substrate portion 110K protruding from the power module 110A (the resin mold thereof) are bent in a direction towards the surface 110Aa of the power module 110A (or in a direction away from the back surface 110Ab, or a direction substantially perpendicular to a spreading direction of the surface 110Aa).

In the bus bar assembly 110C, tips of the bus bars 110P, 110O protrude and are bent similarly to the substrate portions 110J, 110K of the power module 110A.

The bus bar assembly 110C is assembled onto the surface 110Aa side of the power module 110A.

Then, the terminal sections 110Ja, 110Ka of the substrate portions 110J, 110K come in contact with the tips of the bus bars 110P, 110O.

Then, the contact portions (the terminal sections 110Ja, 110Ka) are joined by welding.

As described above, the power module 110A and the bus bar assembly 110C can be connected.

In FIG. 8, in order not to expose the substrate portions 110J, 110K and the bus bars 110P and 110O, the peripheries thereof are surrounded by caps 114A, and insulating resins 114B are filled therein.

Note that the cap 114A is a member for holding the resin 114B therein, and a hole for injecting the resin 114B before solidification may be formed.

In addition, as shown in FIG. 8, a silicon resin layer 114C filled with thermally conductive silicone resin is formed between the resin 114B and the cooling fins 110B.

[Other Power Assemblies]

The power assembly 111 shown in FIG. 2 is an aggregate of components constituting an inverter circuit and a rectification circuit.

The power assembly 111 has a configuration substantially similar to that of the power assembly 110.

Unspecified configurations of the power assembly 111 are similar to those of the power assembly 110, and are given the same reference numerals in the drawing.

Figure 9:
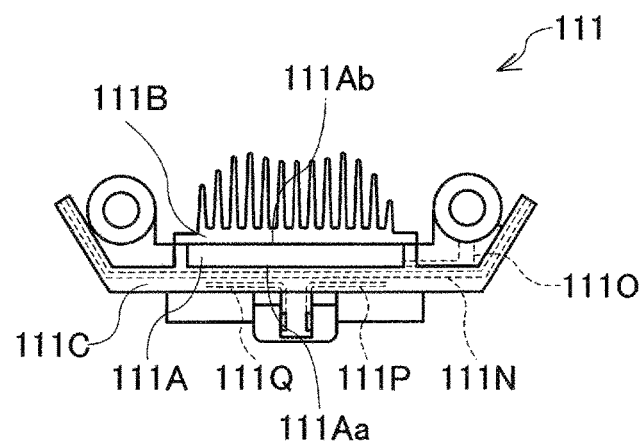
FIG. 9 is a front view showing a configuration of another power assembly.

As shown in FIG. 9, the power assembly 111 includes a power module 111A, cooling fins 111B, and a bus bar assembly 111C.

The power module 111A is a switching element module having four switching elements constituting the inverter circuit and the rectification circuit, and MOSFETs 111D to 111G.

The MOSFETs 111D and 111E, and the MOSFETs 111F and 111G are connected in series, respectively.

Sources of the MOSFETs 111D and 111F are connected to drains of the MOSFETs 111E and 111 G, respectively.

The cooling fins 111B shown in FIG. 9 are members made of metal for dissipating the heat generated by the power module 111A.

The bus bar assembly 111C is an aggregate of components for wiring the power module 111A.

More specifically, the bus bar assembly 111C is a member that fixes the bus bars 111N to 111Q for wiring the power module 111A with resin.

The power module 111A is fixed to the bus bar assembly 111C in a state of being connected to the bus bars 111N to 111Q.

The cooling fins 111B are fixed to the power module 111A and the bus bar assembly 111C.

The power assembly 112 shown in FIG. 2 is an aggregate of components constituting an inverter circuit and a rectification circuit.

The power assembly 112 has a configuration substantially similar to those of the power assemblies 110, 111.

Unspecified configurations of the power assembly 112 are similar to those of the power assemblies 110, 111, and are given the same reference numerals in the drawing.

Figure 10:
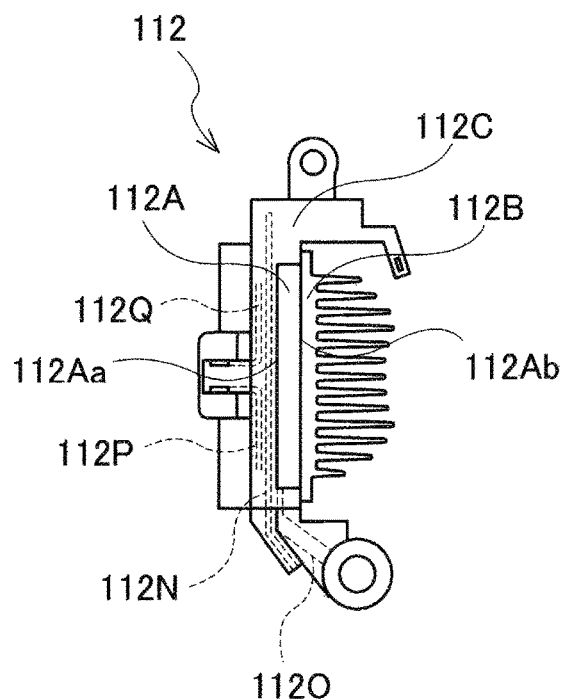
FIG. 10 is a front view showing a configuration of yet another power assembly.

As shown in FIGS. 2 and 10, the power assembly 112 includes a power module 112A, cooling fins 112B, and a bus bar assembly 112C.

The power module 112A is a switching element module having four switching elements constituting the inverter circuit and the rectification circuit, and MOSFETs 112D to 112G.

The MOSFETs 112D and 112E, and the MOSFETs 112F and 112G are connected in series, respectively.

Sources of the MOSFETs 112D and 112F are connected to drains of the MOSFETs 112E and 112 G, respectively.

The cooling fins 112B shown in FIGS. 2 and 10 are members made of metal for dissipating the heat generated by the power module 112A.

The bus bar assembly 112C is an aggregate of components for wiring the power module 112A.

More specifically, the bus bar assembly 112C is a member that fixes the bus bars 112N to 112Q for wiring the power module 112A with resin.

The power module 112A is fixed to the bus bar assembly 112C in a state of being connected to the bus bars 112N to 112Q.

The cooling fins 112B are fixed to the power module 112A and the bus bar assembly 112C.

[Other Structures]

In the present embodiment, as shown in FIG. 4, the MOSFETs 111F to 111G of the power module 111A and the MOSFETs 112D to 112 G of the power module 112A are connected to each phase of a set of three-phase electric windings 101D.

That is, the two power modules 111A and 112A control the set of three-phase electric windings 101D.

The regulator 113 includes a circuit that causes a field current to flow to the rotor 102.

The cover (not shown) is a member made of resin for covering the power terminal-integrated power assembly 110 and the power assemblies 111, 112.

The cover is fixed to the housing 100 (more specifically, the rear housing 100B) so as to cover the power terminal-integrated power assembly 110 and the power assemblies 111, 112 in a state that one end portion of the power terminal 110R is exposed to the outside.

Note that a method of fixing the power assemblies 110, 111, 112 and the like of the controller 11 to the housing 100 (more specifically, the rear housing 100B) is not limited.

In the present embodiment, bolts penetrating the respective power assemblies 110, 111, 112 are used to fix to the housing 100.

[Operation of Controller-Integrated Rotating Electric Machine]

Next, operation of the controller-integrated rotating electric machine 1 will be described with reference to FIGS. 1 and 4.

First, operation when generating the driving force for driving the vehicle will be described.

When the ignition switch is turned on in the vehicle, direct current is supplied to the rotor winding 102C via the brushes 104 and the slip rings 103 shown in FIG. 1 by the regulator 113.

When the direct current is supplied to the rotor winding 102C, magnetic poles are formed on an outer circumferential surface of the rotor 102.

When the vehicle is in a state of receiving a signal from a vehicle-side ECU (not shown), the direct current is supplied from the battery B1 to the power modules 110A, 111A, 112 A, as shown in FIG. 4.

The MOSFETs 110D to 110G, 111D and 111E constituting the inverter circuit switch at a predetermined timing so as to convert the direct current supplied from the battery B1 into three-phase alternating current.

In addition, the MOSFETs 111F, 111G, and 112D to 112G constituting the inverter circuit switch at a predetermined timing so as to convert the direct current supplied from the battery B1 into three-phase alternating current.

As a result, three-phase alternating current is supplied to the first windings 101C and second windings 101D.

Thereby, the rotating electric machine 10 generates the driving force for driving the vehicle.

Next, generating electric power for charging the battery will be described.

In a state where the direct current is supplied to the rotor winding 102C shown in FIG. 1 via the regulator 113 and the magnetic poles are formed on the outer circumferential surface of the rotor 102, when the driving force is supplied from the engine, each of the first windings 101C and the second windings 101D generate the three-phase alternating current.

The MOSFETs 110D to 110G, 111D and 111E constituting the rectification circuit switch at a predetermined timing so as to rectify the three-phase alternating current generated by the first windings 101C.

In addition, the MOSFETs 111F, 111G, and 112D to 112G constituting the rectification circuit switch at a predetermined timing so as to rectify the three-phase alternating current generated by the second windings 101D.

As a result, the three-phase alternating currents generated by the first windings 101C and the second windings 101D are converted into direct current and supplied to the battery B1.

Thus, the battery B1 is charged by electric power generated by the rotating electric machine 10.

[Effects of Controller-Integrated Rotating Electric Machine]

Next, effects of the controller-integrated rotating electric machine 1 of the present embodiment will be described.

[First Effect]

In the controller-integrated rotating electric machine 1 of the present embodiment, the cooling fins 110B (including 111B, 112B) are joined to the power module 110A (including 111A, 112A).

In addition, the anodized coating as an insulating coating is formed on the cooling fins 110B.

Since the cooling fins 110B have the anodized coating thereon, no potential difference is generated between the power module 110A and the cooling fins 110B.

As a result, migration and tracking between the two can be suppressed from occurring, and deterioration of the performance of the controller-integrated rotating electric machine 1 due to insulation failure between them can be prevented from occurring.

In addition, since the cooling fins 110B have the insulating coatings, the insulation between the power module 110A and the cooling fins 110B can be inspected by applying a potential (giving a potential difference) between them.

Furthermore, by adjusting a magnitude of the applied potential difference, it becomes possible to check the breakdown voltage of an insulation part. That is, insulation reliability is improved.

Furthermore, since the cooling fins 110B have the insulation coatings, no potential difference is generated between the cooling fins 110B and the power module 110A even if an abnormality occurs in the cooling fins 110B, so that high insulation reliability can be obtained.

Incidentally, as an abnormality of the cooling fins 110B, for example, it may be mentioned that a terminal having another potential comes in contact with the cooling fins 110B, or the cooling fins 110B have an electric conduction path of electric potential due to water such as salt water.

[Second Effect]

In the present embodiment, the cooling fins 110B (including 111B, 112B) are joined to the power module 110A (including 111A, 112A) by the insulating adhesive.

According to this configuration, the cooling fins 110B and the power module 110A can be fixed while securing electrical insulation between them.

Furthermore, since the insulating adhesive has a high thermal conductivity, the adhesive has functions of fixing both of them and radiating heat.

That is, the number of parts can be reduced, and the cost required for the rotating electric machine 1 can be reduced.

[Third Effect]

In the present embodiment, the cooling fins 110B (including 111B and 112B) are made of aluminum having the anodized coating as an insulation coating.

According to this configuration, an electrically insulating coating can be applied to the cooling fins 110B having excellent thermal conductivity.

Furthermore, since the anodized coating is formed by processing aluminum, it is a coating (insulation coating) that does not cause peeling.

This also ensures electrical insulation between the cooling fins 110B (including 111B and 112B) and the power module 110A (including 111A and 112 A).

[Fourth Effect]

In the present embodiment, each of the cooling fins 110B (including 111B and 112B) has the same sectional shape in the direction perpendicular to the rotating shaft 102A of the rotor 102, and the anodized coatings are formed on the outer peripheral surfaces other than both axial end surfaces.

The cooling fins 110B having such a structure can be manufactured by molding a long shaped aluminum molded body, and cutting it to a predetermined length after forming the anodized coatings thereon.

The pure aluminum molded body before forming the anodized coating has low hardness (that is, plastic deformation is likely to occur), and burrs are generated on cut surfaces when a long shaped molded body is cut.

However, when the anodized coating is formed, the hardness becomes high (that is, plastic deformation hardly occurs), and occurrence of burrs can be suppressed from being generated even if similar cutting processing is performed.

That is, it becomes possible to manufacture by the manufacturing method mentioned above, and the cooling fins 110B can be manufactured without performing a process of removing burrs.

It should be noted that it is preferable to apply a treatment for forming the anodized coating on the cut surface of the cut molded body (molded body having the coatings) in this manufacturing method.

[Fifth Effect]

In the present embodiment, the controller 11 is divided into three power modules (a plurality of module portions) 110, 111, and 112.

According to this configuration, the respective power modules 110 to 112 can be densely arranged along the circumferential direction of the rotating shaft 102A of the rotor 102.

This can suppress the size of the controller 11 from increasing.

In addition, the degree of freedom of the assembling positions of the respective power modules 110 to 112 is improved, and thus the cooling performance can be enhanced.

Furthermore, by having the three power modules 110 to 112, even if any abnormality occurs in any one of the power modules 110 to 112, it can be coped with by only replacing the concerned power module.

This can reduce the cost required for maintaining the rotating electric machine 1.

[Sixth Effect]

In the present embodiment, the stator 101 includes two sets of three-phase electric windings 101C and 101D.

Further, each of the three-phase electric windings 101C and 101D is controlled by two different power modules 110, 111, and 111, 112.

With this configuration of the power modules 110 to 112, the fifth effect described above can be demonstrated more reliably.

[Seventh Effect]

In the present embodiment, each of the power modules 110 to 112 has ICs 110H to 112 H for controlling respective MOSFETs (switching elements).

Since each power module has an IC, a signal line connecting the MOSFET and the IC is also arranged in the power module.

This can improve environmental resistance and vibration resistance of the power modules 110 to 112.

Furthermore, since the length of the signal line is shortened, EMC resistance is also improved.

[Eighth Effect]

In the present embodiment, each of the power modules 110 to 112 is arranged along the circumferential direction of the rotating shaft 102A of the rotor 102.

According to this configuration, the regulator 113 and the three power modules 110 to 112 can be arranged along the circumferential direction of the rotating shaft 102A over the entire circumference.

In other words, the size of the controller 11 can be suppressed from increasing.

[Ninth Effect]

In the present embodiment, the high potential side MOSFETs 110D and 110F are connected to the battery (B1) via a single substrate portion 110I.

The substrate portion 110I includes two connecting portions 110Ia, 110Ia (a plurality of connecting portions) that are the connecting portions of the bus bar 110N of the bus bar assembly 110C.

According to this configuration, damage to the power module 110 (111, 112) can be suppressed from occurring.

Further, it is possible to set a joining condition (welding condition) between the substrate portion 110I and the bus bar 110N to the same condition as the other joining part (welding part).

That is, it is possible to suppress cost required for manufacturing the power module 110 (111, 112) from increasing.

Specifically, in the present embodiment, the drain sides of the high potential side MOSFETs 110D and 110F are connected to the single substrate portion 110I.

Then, the bus bar 110N is connected to the positive electrode of the battery B1.

According to this configuration, two high-potential currents (large currents) of the MOSFET 110D and the MOSFET 110F flow through the substrate portion 110I.

When there is only one connecting portion, a large current concentrates at this connecting portion, and problems such as heat generation are likely to occur.

On the other hand, concentration of a large current can be suppressed from occurring by providing two (a plurality of) connecting portions.

In other words, damage to the power module 110 (111, 112) can be suppressed from occurring.

Further, the connection portion between the substrate portion 110I and the bus bar 110N is welded.

Since the number of the connecting portions 110Ia, 110Ia serving as the welding portions is plural, it is possible to lower respective welding conditions.

That is, in order to weld at a single place, it is necessary to increase the size of the connecting portion 110Ia because of the above-mentioned large current problem.

In this case, it is necessary to make the welding condition higher in output.

Then, the welding condition of the connecting portion 110Ia becomes different from those of the other connecting portions 110Ja, 110La, and in manufacturing the power module 110 (111, 112), it is necessary to adjust the manufacturing equipment to the welding condition with high output, and it is necessary to change the conditions.

This leads to an increase in manufacturing cost.

On the other hand, as in the present embodiment, by providing the plurality of connecting portions 110Ia (provided at two positions), it is possible to make the connecting portion 110Ia have the same shape as the other connecting portions 110Ja, 110La, and to make the welding conditions the same.

In other words, it is not necessary to change the welding conditions, and the power module 110 can be obtained at lower cost.

[Tenth Effect]

In the present embodiment, the substrate portion 110I (111I, 112I) connected to the positive electrode of the battery B1, the substrate portion 110L (111L, 112L) and the substrate portion 110J (111J, 112J), and the substrate portion 110K (111 K, 112 K) of the power assembly 110 (111, 112) are assembled in a state of being away from the back side of the resin mold.

According to this configuration, creepage distances between the substrate portions 110I (111I, 112I) and the substrate portions 110K (111K, 112K) can be obtained, and a short circuit failure due to a foreign matter or electric corrosion caused by leakage with the GND can be reduced, and reliability and environmental resistance are improved.

[Eleventh Effect]

In the present embodiment, the substrate portions 110I (111I, 112I) of the power assembly 110 (111, 112) connected to the positive electrode of the battery B1 and the motor side terminals 110J, 110L of the power assembly 110 (111, 112) connected to the rotating electric machine 10 are assembled in the direction away from the housing (specifically, the rear housing 100B).

Further, the power assembly 110 is assembled in a state parallel to the axial direction of the rotating shaft 102A.

According to this configuration, the substrate portions 110I (111I, 112I) of the power assemblies 110 (111, 112) and the motor side terminals 110J, 110L are positioned farthest from the housing 100.

In other words, creepage distances between the substrate portion 110I and the housing 100 can be obtained, and the above-described effects are demonstrated.

[Twelfth Effect]

In the present embodiment, the power assemblies 110 (111, 112) fix the bus bars 110N to 110Q (111 N to 111Q, 112 N to 112 Q) with resin.

Then, parts of the cooling fins 110B (111 B, 112 B) are fixed in a state of being embedded in the resin.

According to this configuration, the resin for fixing the bus bars 110N to 110Q by the power assembly 110 is used for fixing the cooling fins 110B.

That is, it is possible to fix the cooling fins 110B without increasing the number of parts.

Further, since the cooling fins 110B (111B, 112B) are fixed with the insulating resin, it is possible to float the cooling fins 110B (111B, 112B) in potential.

Note that the state in which the parts of the cooling fins 110B (111 B, 112 B) are embedded in the resin means a state in which the resin is molded so that the cooling fins 110B are integrated with the bus bars 110N to 110Q, or a state in which the cooling fins 110B are fixed to the resin by thermal crimping.

In the thermal crimping, the cooling fins 110B and the resin are pressed in a heated state, and the resin covers the parts of the cooling fins 110B (sandwiching parts of edge portions).

According to the thermal crimping as described above, the parts of the radiation fins 110B are embedded in the resin.

[Thirteenth Effect]

In the present embodiment, the cooling fins 110B have the plurality of notches 110S, and the bus bar assembly 110C has the protrusions 110T with the tips having enlarged diameters in a state of penetrating at least two notches 110S.

According to this configuration, the assembling ability of assembling the cooling fins 110B to the bus bar assembly 110C is improved.

In particular, by disposing the notches 110S at symmetrical positions of the cooling fins 110B, it is possible to adjust the orientation of the cooling fins 110B for each of the power modules 110 to 112.

In addition, the bus bar assemblies 110C to 112C have different shapes.

In this case, if there is the protrusion 110T at the same position, interference of a processing jig may occur.

However, if a plurality of (preferably four or more) notches 110S are provided, it is possible to dispose the protrusion 110T on the notch 110S where interference is unlikely to occur, and the assembling ability is improved also.

[Modification of Embodiment]

In the above embodiment, the connection structure between the power module 110A and the bus bar assembly 110C has been described with two substrate portions 110I, 110K protruding from the back side of the resin mold.

Figure 11:
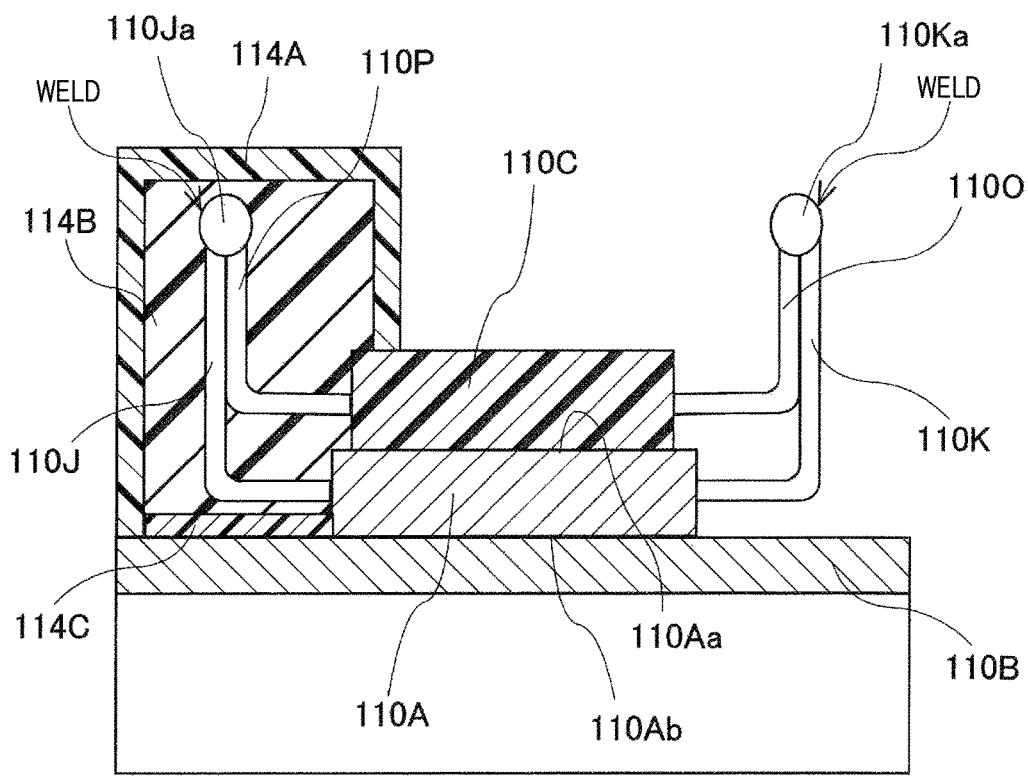
FIG. 11 is a sectional view schematically showing a connection structure between a power module and a bus bar assembly of a modified power assembly.

In this case, as shown in FIG. 11, the low potential side substrate portion 110K may be exposed.

Note that since the low potential side substrate portion 110K has the same potential as the housing 100 in the present modified embodiment, a potential difference is not generated and no problem occurs even if the substrate portion 110K is short-circuited with the housing 100.

With this configuration, the number of the caps 114A and the resin 114B can be reduced, and the power assembly 110 can be obtained at a lower cost.

What is claimed is:

1. A controller-integrated rotating electric machine, comprising: a rotating electric machine having a rotor in which a magnetic pole is formed by energizing a rotor winding, a stator disposed so as to face the rotor, and a housing holding the rotor and the stator; and
    a controller having a plurality of switching element modules, each of which includes a switching element, an inverter circuit for supplying alternating current to the rotating electric machine, and a rectification circuit for rectifying alternating current supplied from the rotating electric machine, wherein:
    cooling fins, each of which has an insulating coating on a surface thereof facing the switching element module, are bonded to the switching element module,
    the controller is divided into a plurality of module portions,
    the stator includes two sets of three-phase electric windings,
    the controller includes high-potential side switching elements and low-potential side switching elements corresponding to respective phases of the three-phase electric windings,
    each of the switching elements of one phase is assembled to a module portion different from a module portion to which each of the switching elements of at least one of the remaining phases is being assembled to,
    the module portion has a control section for controlling each of the switching elements,
    the controller has three module portions each having the switching elements of two phases and the control section,
    the three module portions are arranged along a circumferential direction of a rotating shaft of the rotor,
    the module portion has a bus bar assembly, the bus bar assembly is formed by fixing bus bars to which each of the terminals is connected with a resin,
    the cooling fins are fixed in the bus bar assembly,
    the cooling fins have a plurality of notches, and
    the bus bar assembly has protrusions with tips having enlarged diameters in a state of the tips penetrating at least two notches.

2. The controller-integrated rotating electric machine according to claim 1, wherein,
    the cooling fins are bonded to the switching element module with an insulating adhesive.

3. The controller-integrated rotating electric machine according to claim 1, wherein,
    the cooling fins are made of aluminum having an anodized coating as the insulating coating.

4. The controller-integrated rotating electric machine according to claim 1, wherein,
    the high-potential side switching elements of at least two phases of the module portion are connected to a positive electrode of a battery via a single battery side terminal; and
    the battery side terminal has a plurality of connecting portions connected with an external circuit.

5. The controller-integrated rotating electric machine according to claim 4, wherein,
    the module portion includes the battery side terminal connected to the positive electrode of the battery, a motor side terminal connected to the rotating electric machine, and a low potential side terminal connected to a negative electrode of the battery; and
    the battery side terminal and the motor side terminal protrude in a direction opposite to a direction where the low potential side terminal protrudes mutually.

6. The controller-integrated rotating electric machine according to claim 5, wherein,
    the module portion in a plate shape is fixed to the housing in a state where the low potential side terminal is close to the housing and the battery side terminal is away from the housing, and the module portion is fixed to the housing in a state parallel to a direction in which the rotating shaft of the rotor extends.

* * * * *